United States Patent Office 2,999,989
Patented Sept. 12, 1961

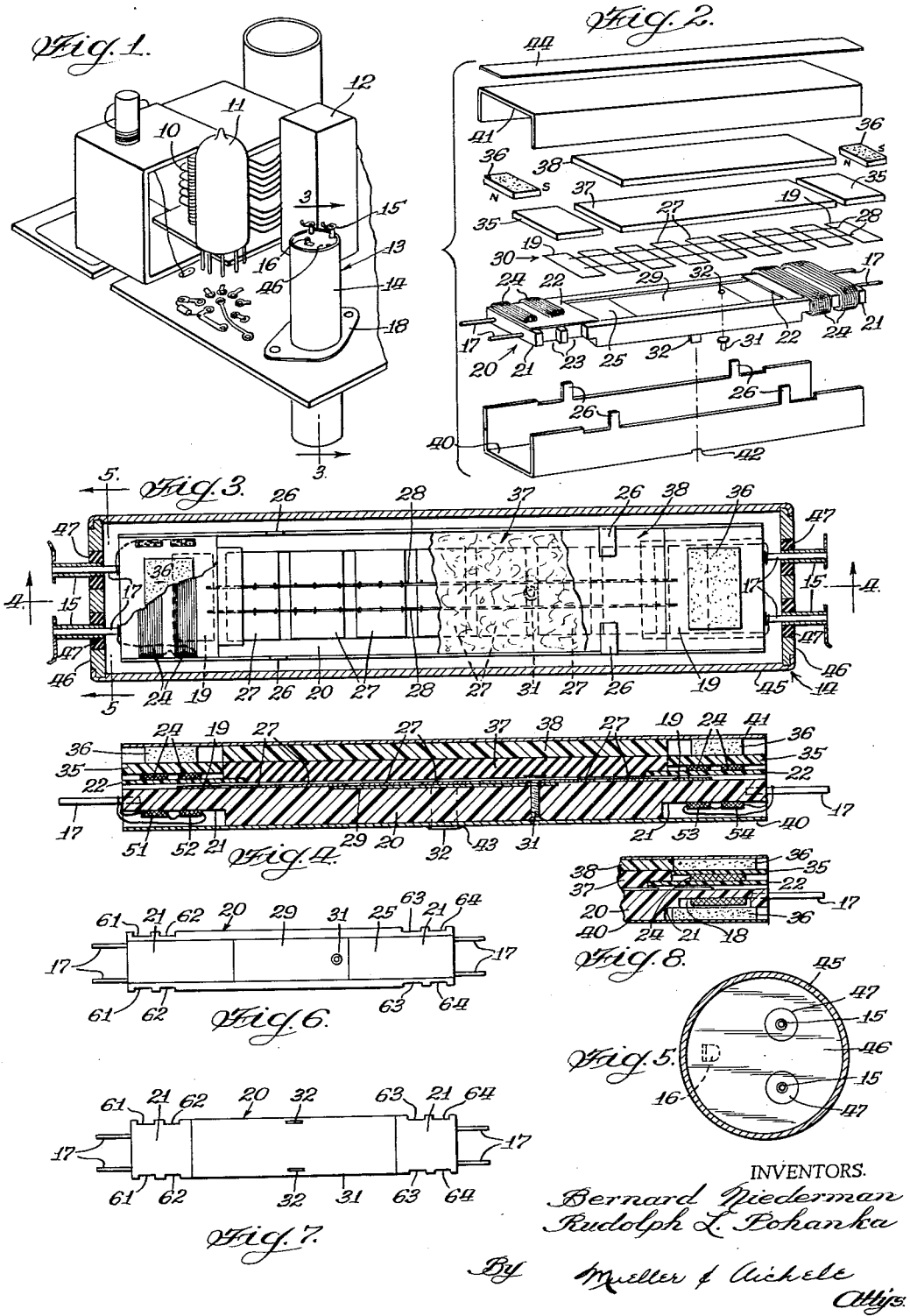

2,999,989
ELECTRO-MECHANICAL FILTER
Bernard Niederman, Chicago, and Rudolph L. Pohanka, Berwyn, Ill., assignors to Motorola, Inc., Chicago, Ill., a corporation of Illinois
Filed Feb. 6, 1958, Ser. No. 713,660
3 Claims. (Cl. 333—71)

This invention relates generally to electromechanical devices and more particularly to electromechanical filter devices which may be used in wave signal receivers to provide frequency selection.

Electromechanical filter devices have previously been proposed for use in radio receivers and other electronic equipment. In certain applications, such electromechanical filters may replace the electrical filters generally used because they have the advantages of providing sharp selectivity and of being reduced in size. Prior units are covered by Patent No. 2,652,542, issued on September 15, 1953 to Myron L. Anthony and Robert M. Virkus, Patent No. 2,799,832, issued on July 16, 1957 to Bernard Niederman and Stanley P. Lapin, and application Serial No. 578,543, filed April 16, 1956 by Bernard Niederman, now U.S. Patent No. 2,905,909. These units operate satisfactorily but some difficulty has been encountered in manufacturing the same. Also the characteristics have not been optimum for certain applications.

It is therefore, an object of the present invention to provide an improved electromechanical wave filter unit of a mechanical construction which facilitates mass production of the units.

A further object of the invention is to provide an improved supporting structure for an electromechanical filter for positioning and holding the parts thereof in assembled relation.

A further object of the invention is to provide an improved construction for an electromechanical filter which includes coupling coils having two sections for increasing selectivity and power efficiency.

A feature of the invention is the provision of an improved electromechanical filter in which the components are disposed in a space-saving arrangement on a simple supporting member which cooperates with an enclosing structure to hold the components in place, thereby providing an efficient and compact construction.

A further feature of the invention is the provision of an improved electromechanical filter including a supporting member which carries a two-section coupling coil on each end thereof and a plurality of vibrating plates on an intermediate surface with the end plates being disposed within only one section of each coil, thereby increasing the overall Q of the filter while providing a simple construction which may be readily mass produced.

Referring to the drawings:

FIG. 1 is a perspective view of a portion of a chassis including the filter in accordance with the invention and other electronic apparatus mounted thereon;

FIG. 2 is an exploded view showing the various parts which make up the filter;

FIG. 3 is an enlarged view partly broken away showing the assembled filter within a container;

FIG. 4 is a cross-sectional view along the lines 4—4 of FIG. 3 showing the assembled filter and excluding the container;

FIG. 5 is a cross-sectional view along the lines 5—5 of FIG. 3;

FIG. 6 is a top plan view showing the supporting member of the filter;

FIG. 7 is a bottom plan view of the supporting member; and

FIG. 8 shows part of an assembled filter including a modified supporting member.

In practicing the invention, there is provided a ladder-like filter structure formed of a plurality of thin rectangular plates which are interconnected by wires extending between the plates and across their narrow dimension. The filter structure is carried by an elongated insulating supporting member, on a rectangular surface which extends between the ends of the member. Conducting pins which extend from the supporting member support the filter within a container and make electrical connections thereto. A coupling coil having two separate windings or sections is wound directly around each end of the supporting member, and the end-plates of the filter structure are positioned within only one section of each coil. The end-plates are made of magnetostrictive material so that the end-plates and the coil sections positioned thereabout are coupled together. The other coil sections, which are separated from the end-plates, provide the proper impedance for matching the filter with associated electrical circuits. The filter structure is held in place by the sides of the supporting member and also by a grommet which overlies the upper surface of a pair of plates.

A resilient member is positioned above the intermediate plates of the filter structure for damping out flexural vibrations, and a retaining plate is positioned above the resilient member to stiffen it. Separating plates are provided above the coupling coils, and above the separating plates are small permanent magnets for producing a biasing field to assist in the magnetostrictive action. Additional magnets may be positioned below the coils. A pair of trough-shaped members surround the filter structure and form a shielding housing therefor. The housing may be positioned inside a cylindrical container whose ends are closed by header plates. The coupling coils are each connected to the conducting pins which extend from the supporting member and which are supported in openings in insulating discs provided in the header plates.

In FIG. 1 there is illustrated a portion of a chassis for an electronic apparatus which includes a tuning condenser 10, a miniature vacuum tube 11, a transformer 12 enclosed by a shielding housing, and an electromechanical filter unit 13 having a cylindrical container 14. A pair of terminal posts 15 for making electrical connections to the filter unit and another terminal post 16 for grounding the container are mounted on header plates 46 which close the ends of the container. This figure illustrates one manner in which the filter may be mounted, that is, with the container 14 extending through an aperture in the chassis and secured thereto by the mounting flange 18 so that electrical connections may be made on both sides of the chassis. The figure also illustrates the relative size of the filter with respect to standard components to point out that the filter is a small, compact unit.

FIG. 2 shows the various components of the filter in a position to be assembled, and FIGS. 3 and 4 show the components in their assembled relation. The member 20 is the main supporting member for the unit, and it is preferably molded from insulating plastic material such as Bakelite. The upper side of the supporting member 20 has a channel shape, and a coil supporting plate 22 made of fibrous material is mounted at each end of the supporting member and bridges the channel so that an unobstructed space remains under each plate. The end portions 21 of the supporting member 20 are of a reduced thickness, and notches 23 are provided in the edegs thereof. Coupling coils 24 are wound around the end portions 21 over the coil supporting plates 22 and through the notches 23. Separate forms for the coils are not required and the structure is therefore simplified. A pair of terminals 17 are positioned at each end of the supporting member 20 for making electrical connections to the coupling coils 24.

A conductive plate 29 is embedded in the mounting surface 25 and has a pair of ears 32 extending down through the supporting member 20. A filter structure 30, including a plurality of plates 27 disposed in edge-to-edge relationship and interconnected by wires 28, is positioned on the mounting surface 25 with some of the intermediate plates 27 contacting the conductive plate 29 and with the end-plates 19 extending under the coil supporting plates 22 within the coils 24. Vibrations are produced in those plates in response to current applied to one of the coupling coils as will be explained more fully hereinafter. The grommet 31 mounted in aperture 32 in member 20 extends upwardly between and overlies a pair of the plates 27.

Positioned above the coils 24 are separating plates 35 of fibrous material, and above the separating plates are permanent magnets 36 preferably of ferrite material. The separating plates and magnets may be cemented in place. A strip 37 of resilient material such as foamy plastic is placed over the intermediate plates 27 for damping the vibrations of the plates, and a retaining plate 38 of fibrous material is positioned over the strip 37 to stiffen it.

The supporting member 20 with the above-described parts positioned thereon is enclosed within a shielding housing forming by the two trough-shaped members 40 and 41 which are made of metal. The supporting member 20 rests on the bottom of the member 40 with the ears 32 extending through the apertures 42. A plurality of tabs 26 extend up from the sides of the member 40, and these tabs are bent over the top of the retaning plate 38 to hold it in position. The upper trough member 41 is then slipped down over the lower trough member 40 and sealed in place as by soldering to complete the shielding housing for the unit. The ears 32 are bent over and soldered to the lower housing member 40 as shown at point 43 in FIG. 4 in order to ground the plates 27 to the housing. A conductive strip 44 may also be soldered to the housing and the container 14 in order to establish a common potential between the housing and the container. Thus, both the housing and the container act to shield the coupling coils from each other and from other components to prevent objectionable interaction between them.

Further details of the construction and the operation of the filter will be more apparent from a consideration of FIGS. 3–7. In FIG. 3 the filter is shown in assembled relation within the container 14. This figure considered along with the sectional view of FIG. 5 shows that the container 14 consists of a tubular member 45 made of metal and a pair of header members 46, also of metal, which close the ends of the tube. The header members 46 abut against shoulders which are provided near the ends of the tube 45, and the ends of the tube are rolled over or soldered thus holding the header members firmly in place to provide a sealed enclosure. The conducting strip 44 may be connected to the container through one header 46 as the headers are mounted in place. A pair of annular insulating discs 47 are carried in apertures in the headers, and the tubular mounting posts 15 are inserted into the central openings in the discs. The terminal conducting pins 17 extend into the hollow center of the posts 15 and make contact with their walls so that electrical connections for the terminal pins may be made from the outside of the container.

The specific construction of the supporting member 20 is shown in detail in FIGS. 6 and 7. The upper side of the supporting member 20, as seen in FIG. 6, has a rectangular mounting surface 25, and the sides of the member extend slightly above the mounting surface to form a channel. A metal plate 29 is embedded in the supporting member flush with the mounting surface 25, and a pair of ears 32, which are integral portions of the plate 29, extend downwardly through the supporting member and project out from the lower surface, as may be seen in FIG. 7. The end portions 21 of the supporting member 20 are of a reduced thickness, and the edges of the end portions are provided with four pairs of opposing notches 61, 62, 63 and 64. Each pair of notches receives and retains a separate winding or section of the coils 24.

As is shown in FIG. 4, the coil 24 at one end of the supporting member 20 includes a driving section 52 wound through the notches 62, and an impedance matching section 51 connected in series therewith and wound through the notches 61. Similarly, the coil 24 at the other end of the supporting member 20 includes a pickup section 53 retained in the notches 63 and another series connected impedance matching section 54 retained in the notches 64. The ends of each coupling coil are connected to the terminal pins 17 to complete the electrical connections within the filter.

It may sometimes be desirable to use magnets on both the upper and lower sides of the coupling coils 24. FIG. 8 shows a modified form of the supporting member 20 which lends itself to this construction. The end positions 21 are undercut as illustrated to form a slot 18, and the coil 24 is positioned in this slot. Magnets 36 are then positioned above and below the coil as illustrated. The coil 24 may have one section or two sections as previously described.

The filter structure 26 rests on the mounting surface 25 of the supporting member and is held against transverse movement in the channel formed by the upwardly extending sides of the supporting member 20. The filter structure is held against longitudinal movement by the grommet 31 which extends down between a pair of the plates 27 and engages the edges thereof. The grommet 31 has a portion on its upper end which overlies the upper surfaces of these plates and holds the filter structure against the mounting surface 25.

The wires 28 which extend continuously across the plates 19 and 27 are secured to the plates at several points across their width. This is accomplished by spot welding the wires to the plates at frequent intervals, and the use of continuous wires which are tacked down at short intervals provides a good mechanical connection. The spacing of the coupling wire 28 along the longer dimension of the plates affects the bandwidth which will be passed by the filter unit, and this bandwidth may be controlled by controlling the position of the coupling wires as described in the aforementioned Patent No. 2,799,832 issued to Bernard Niederman and Stanley P. Lapin. When the coupling wires 28 are spaced at the nodal points with respect to the flexural vibrations of the plates, it has been found that spurious responses normally associated with such flexural vibrations are eliminated as is described in the aforementioned co-pending application of Bernard Niederman, Serial No. 578,543.

The end-plates 19 of the filter unit extend underneath the coil retaining plates 22 and are positioned respectively within the driving section 52 and the pickup section 53. The end-plates are made of magnetostrictive material so that electric current applied to section 52 causes the end-plate positioned therein to vibrate. The vibrations are transmitted down the filter unit to the other end-plate 19 where the resulting vibrations are converted back into electric currents in the pickup section 52. The matching sections 51 and 54 are provided with the proper impedance so that the filter unit may be coupled to associated electric circuits with a minimum of power loss. The end-plates 19 tend to lower the Q of the coils positioned around them, but by separating the matching windings from the end-plates, the overall Q of the coupling coils as a whole is increased. Since the insertion loss of the filter is determined to a large extent by the Q of the coupling coils, this increase results in substantially lower insertion losses for the filter in general. Furthermore, the higher Q improves the selectivity of the filter.

It may be seen from the above description that a very compact electromechanical filter unit is provided. Much of the compactness arises from the simple yet effective construction of the supporting member which supports and retains the parts in the proper relationship. The coupling coils are separated into individual windings which are retained in pairs of opposing notches provided in the edges of the supporting member. By separating the impedance matching winding from the endplates the overall Q of the filter is substantially increased which results in high selectivity and low insertion losses. No separate elements are required to support the matching windings. The components of the filter may be readily formed, and the filter construction in general lends itself to mass production techniques so that electromechanical filter units may be produced in large quantities at low cost.

We claim:

1. An electromechanical filter for use with electrical circuits including in combination, a filter structure including a plurality of plates disposed in edge-to-edge spaced relationship and interconnected by wires, a pair of inductive coils for coupling said filter structure to the electrical circuits, said coils each having separate sections, an elongated unitary supporting member of insulating material having an intermediate portion supporting said filter structure and having opposite end portions respectively supporting said coils in operative relation, a container surrounding said supporting member and said filter structure thereon and having closure members positioned at the end portions of said supporting member, a pair of terminal pins directly attached to said end portions of said supporting member and projecting therefrom through said closure members in engagement therewith so as to support said supporting member within said container, said end portions each having a plurality of notches therein disposed in opposing pairs and a recess interconnecting the same, said coils being wound around said supporting member at opposite ends thereof with said separate sections of each coil being disposed in said recesses and in said pairs of notches, said pairs of notches retaining said sections in spaced relationship with respect to each other, a pair of magnets disposed on opposite sides of each of said coils, said filter structure having end-plates at opposite ends thereof disposed respectively between said magnets and within the sections of said coils nearest the center of said supporting member and spaced from the sections of said coils nearest the ends of said supporting member for minimizing power losses.

2. An electromechanical filter for use with electrical circuits including in combination, a filter structure including a plurality of plates disposed in edge-to-edge spaced relationship and interconnected by wires, said structure having an end-plate at each end thereof, a pair of inductive coils for coupling said filter structure to the electrical circuits, said coils each having first and second separate sections, an elongated unitary supporting member of insulating material for supporting said filter structure and having opposite end portions respectively supporting said coils in operative relation, a shielding container surrounding said supporting member and said filter structure thereon and having closure members at the ends thereof, a pair of terminal pins directly attached to each of said end portions of said supporting member and projecting therefrom through said closure members, said supporting member having opposite longitudinal sides and a mounting surface disposed between the same and recessed with respect thereto to form a channel, said sides having a plurality of notches therein at each of said end portions of said supporting member and disposed along the length of said supporting member in opposing pairs, and retaining means mounted on said mounting surface and having a portion projecting thereabove, said coils being wound around said respective end portions of said supporting member with said first and second sections disposed in said pairs of notches and retained thereby in spaced relationship with respect to each other, said filter structure being carried on said mounting surface with said plates abutting against the sides of said supporting member and against said projecting portion of said retaining means to prevent sliding movement with respect to said mounting surface, said end-plates being disposed respectively within said first sections of said coils and being spaced from said second sections of said coils for minimizing power losses.

3. An electromechanical filter for use with electrical circuits including in combination, a filter structure including a plurality of plates disposed in edge-to-edge spaced relationship and interconnected by wires, said structure having an end-plate at each end thereof, a pair of inductive coils for coupling said filter structure to the electrical circuits, said coils each having first and second sections, an elongated unitary supporting member of insulating material for supporting said filter structure and having opposite end portions respectively supporting said coils in operative relation, and a plurality of conducting terminal pins mounted on said end portions of said supporting member and connected to said coils, a shielding container surrounding said supporting member and said filter structure thereon and having closure members with insulating portions at the ends of said supporting member, said terminal pins projecting through said insulating portions, said supporting member having opposite longitudinal sides and a mounting surface disposed between the same and recessed with respect thereto to form a channel, said sides having a plurality of notches therein disposed along the length of said supporting member in opposing pairs, and retaining means on said mounting surface and having a portion projecting thereabove, said coils being wound around said respective end portions of said supporting member with said first and second sections disposed in said pairs of notches and retained thereby in spaced relationship with respect to each other, said filter structure being carried on said mounting surface with said plates abutting against the sides of said supporting member and against said projecting portion of said retaining means to prevent sliding movement with respect to said mounting surface, said retaining means including parts overlying a pair of said plates to prevent movement of said filter structure away from said mounting surface, said end-plates being disposed respectively within said first sections of said coils and being spaced from said second sections of said coils for minimizing power losses.

References Cited in the file of this patent

UNITED STATES PATENTS

| | | |
|---|---|---|
| 2,342,869 | Kinsley | Feb. 29, 1944 |
| 2,462,489 | Hallett | Feb. 22, 1949 |
| 2,569,036 | Benner et al. | Sept. 25, 1951 |
| 2,652,542 | Anthony et al. | Sept. 15, 1953 |
| 2,799,832 | Niederman et al. | July 16, 1957 |